July 27, 1943.   E. F. BRITTEN, JR   2,325,365
MAGNETIC COMPASS
Filed Jan. 23, 1943   6 Sheets-Sheet 1
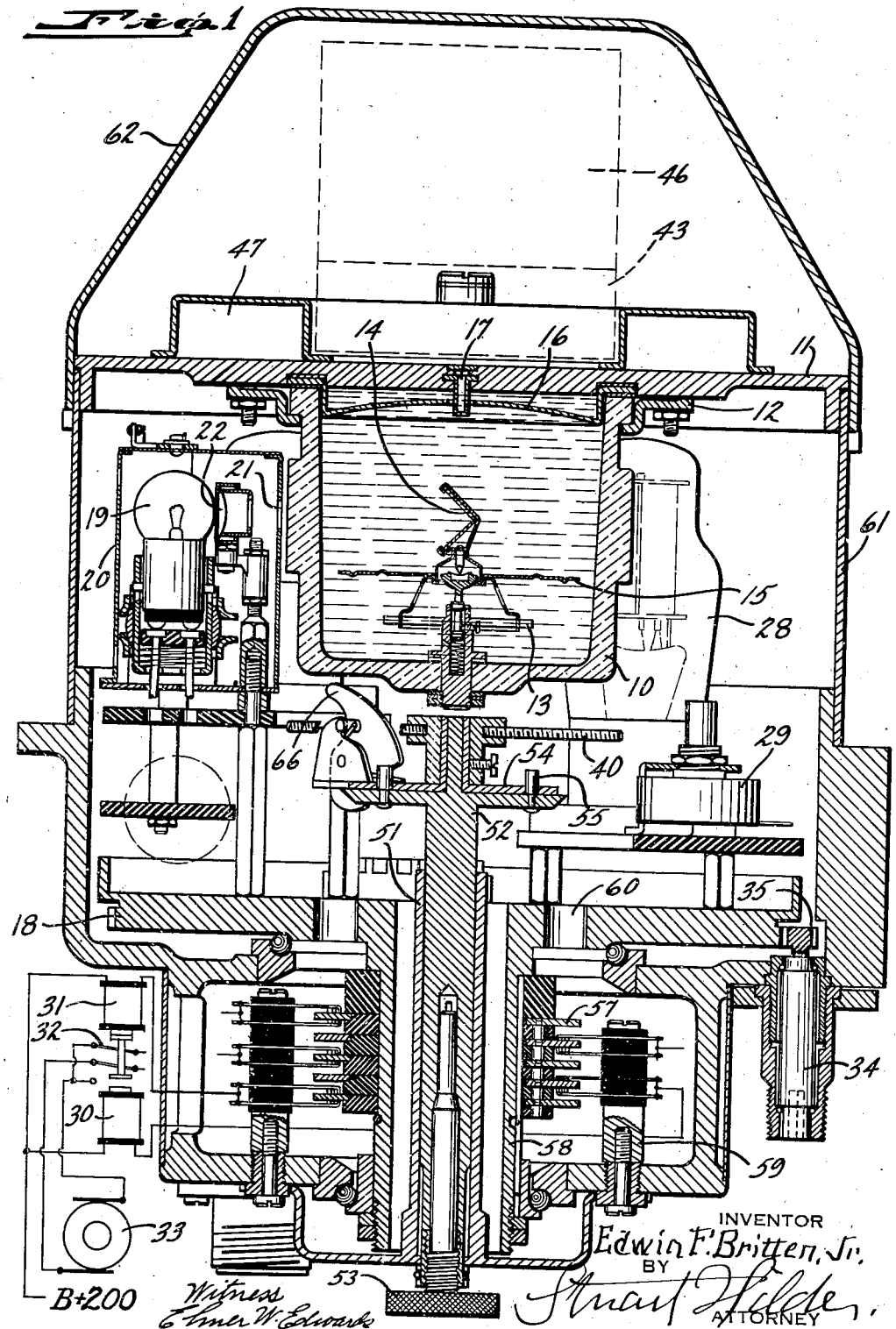

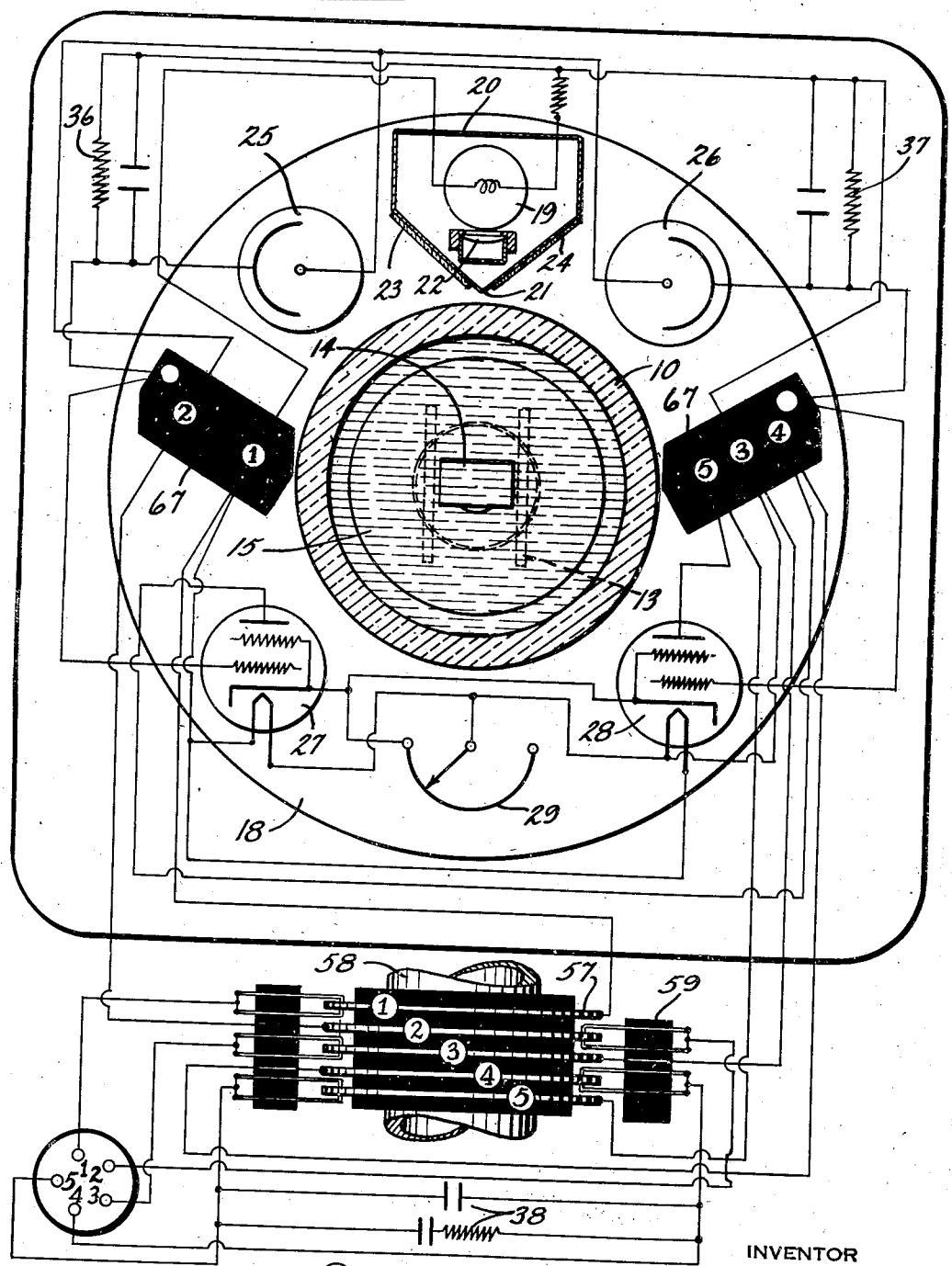

July 27, 1943.  E. F. BRITTEN, JR  2,325,365
MAGNETIC COMPASS
Filed Jan. 23, 1943  6 Sheets-Sheet 3
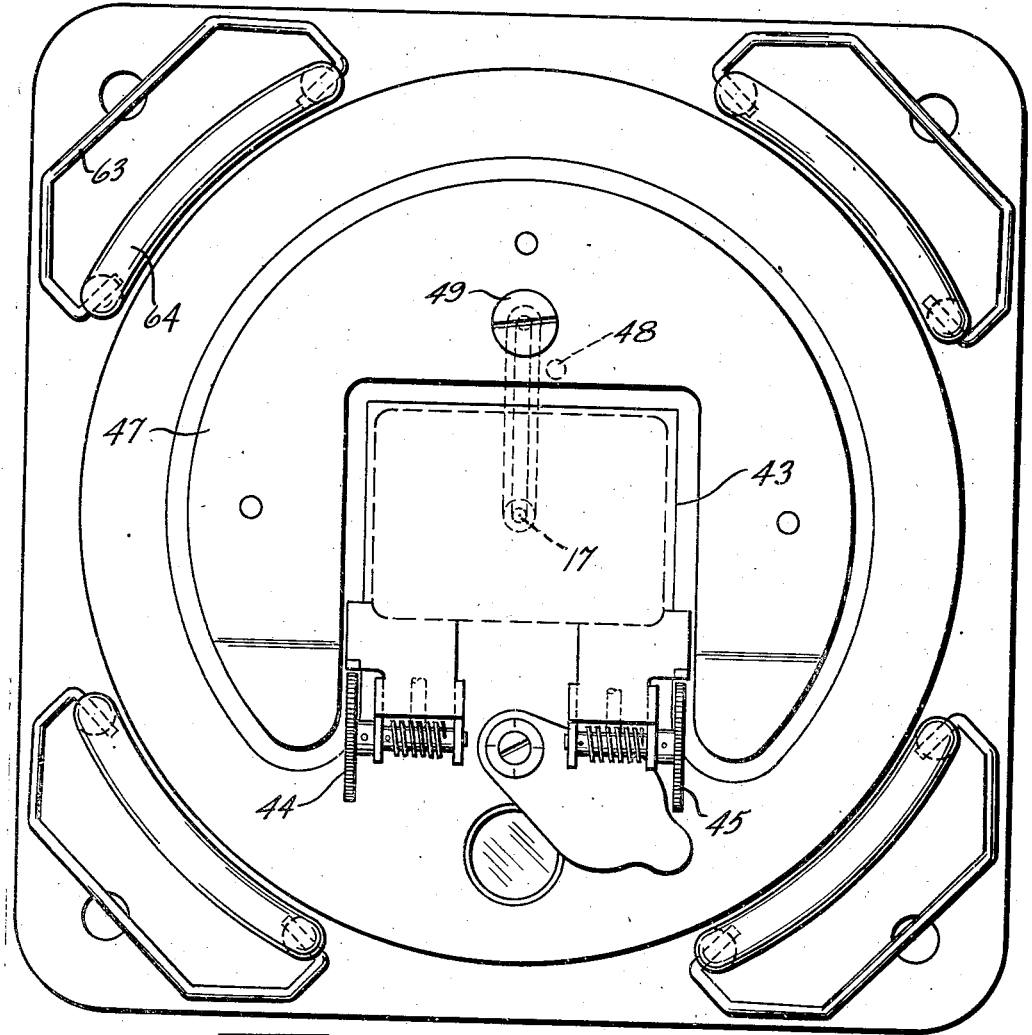
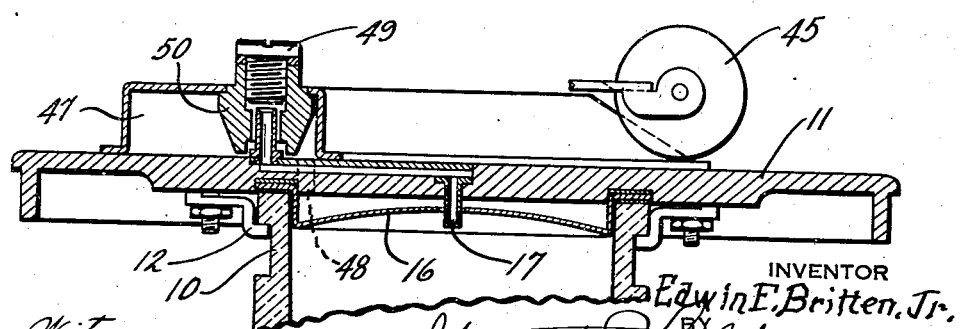
INVENTOR
Edwin E. Britten, Jr.
Witness
Elmer W. Edwards
BY Stuart Wilder
ATTORNEY July 27, 1943.  E. F. BRITTEN, JR  2,325,365
MAGNETIC COMPASS
Filed Jan. 23, 1943  6 Sheets-Sheet 4

Witness
Elmer W. Edwards

INVENTOR
Edwin F. Britten, Jr.
BY
ATTORNEY

July 27, 1943.　　　E. F. BRITTEN, JR　　　2,325,365
　　　　　　　　　　MAGNETIC COMPASS
　　　　　　　　　Filed Jan. 23, 1943　　　6 Sheets-Sheet 5

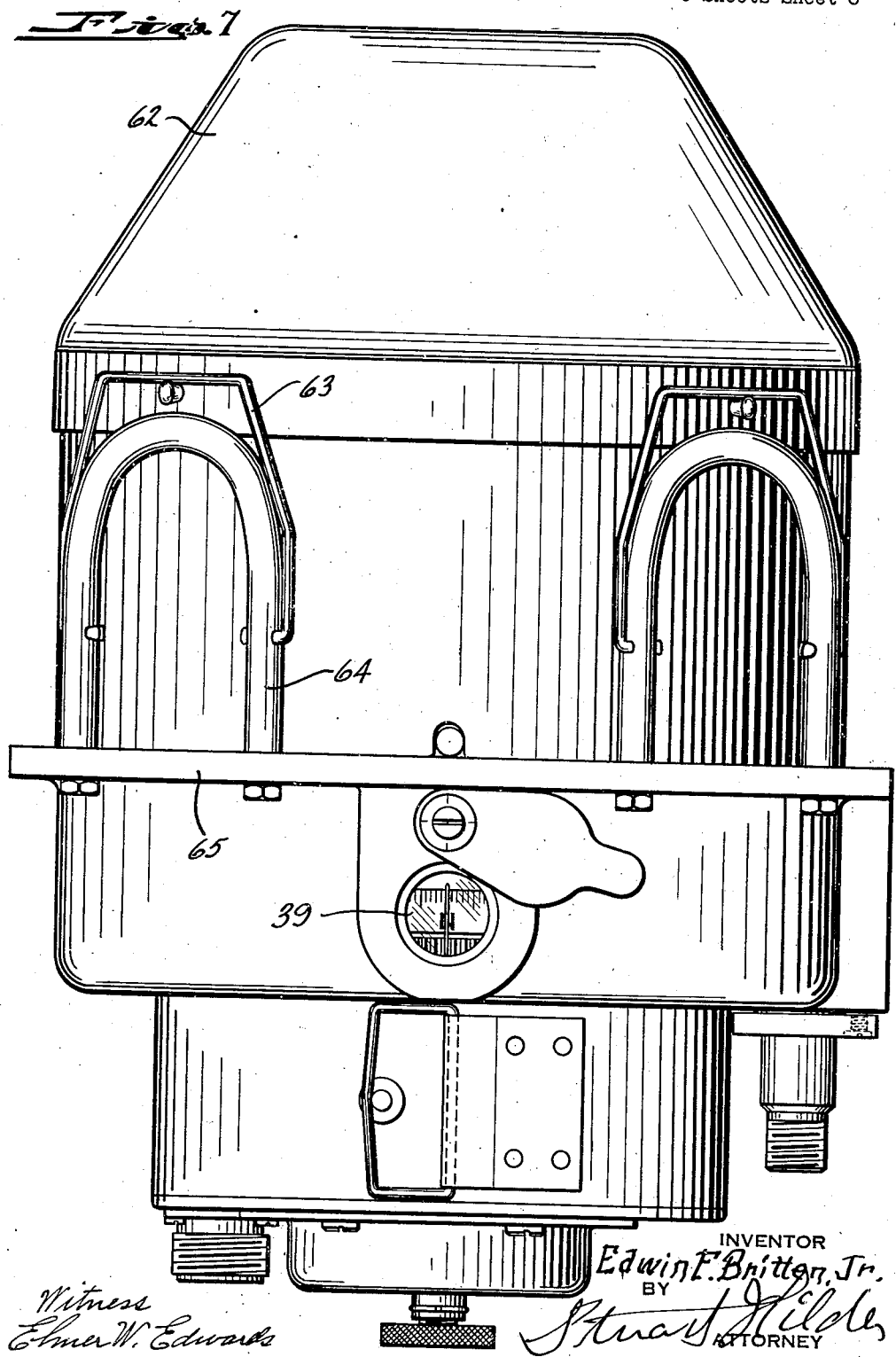

Patented July 27, 1943

2,325,365

UNITED STATES PATENT OFFICE 2,325,365

MAGNETIC COMPASS

Edwin F. Britten, Jr., Short Hills, N. J., assignor to Monroe Calculating Machine Company, Orange, N. J., a corporation of Delaware Application January 23, 1943, Serial No. 473,355

6 Claims. (Cl. 33—223)

The invention has relation to magnetic compasses and it consists in the novel construction and combination of parts as set forth in the appended claims.

In the accompanying drawings illustrating the invention:

Fig. 1 is a vertical section taken through a compass embodying the present invention.

Fig. 2 is a diagrammatic view illustrating the compass, the photo-electric control devices and the electric wiring.

Fig. 3 is a plan view of the compass casing, with the cover removed.

Fig. 4 is a detail sectional view through the closure plate of the compass bowl, the expansion chamber, etc.

Fig. 7 is an elevation of the casing.

Figure 5:
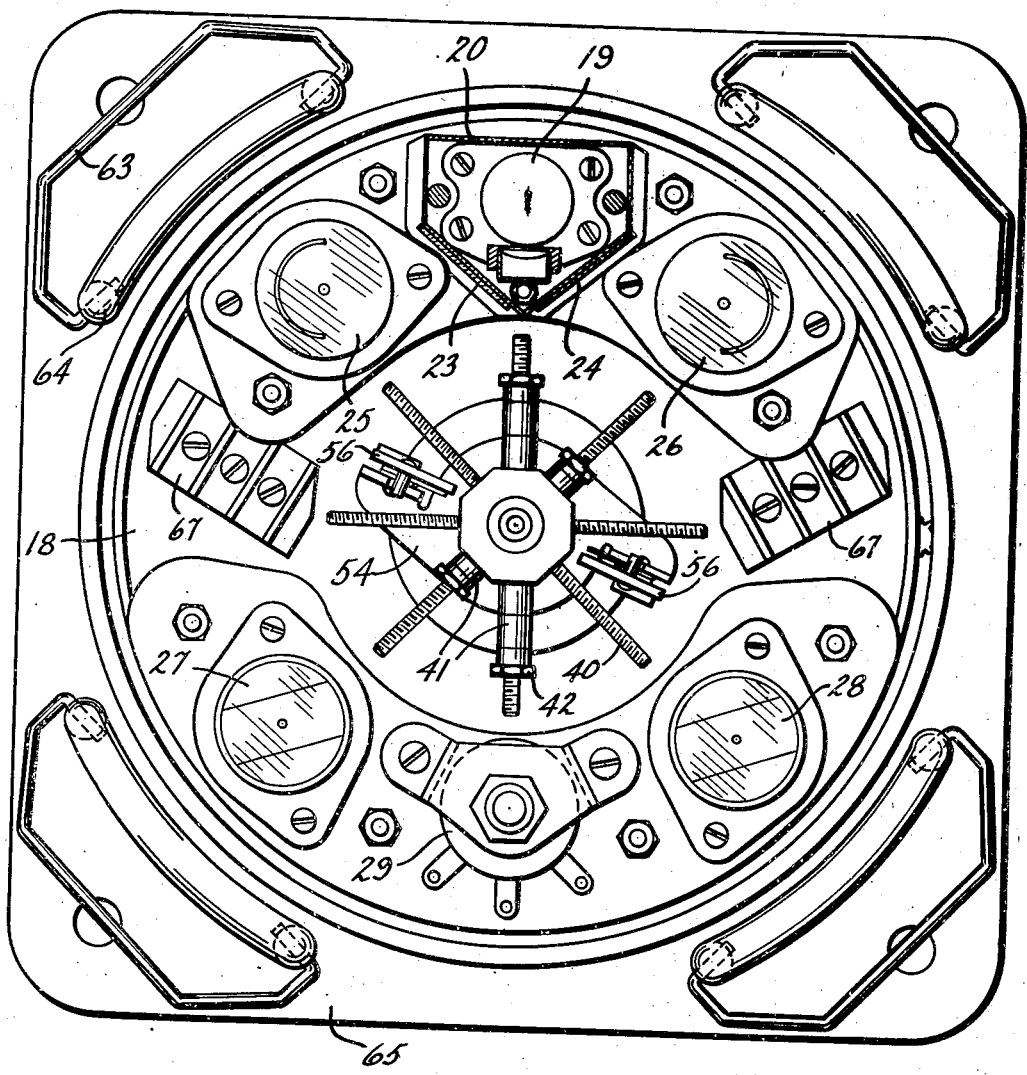
Fig. 5 is a plan view of the compass casing with the compass unit removed.
Figure 6:
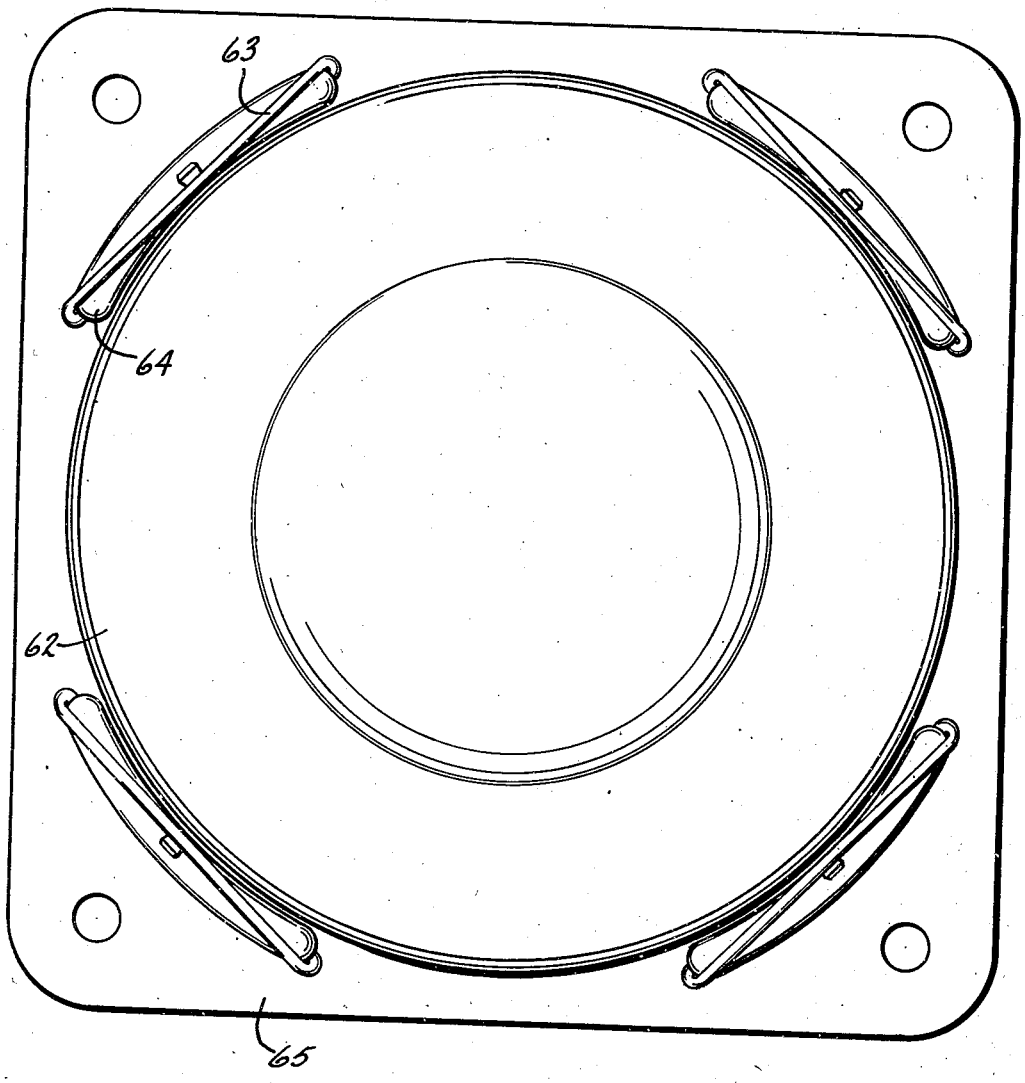
Fig. 6 is a plan view of the casing.

Certain features of the invention relate broadly to magnetic compasses, but more particularly invention is directed to such compasses provided with follower means whereby one or more repeater compasses or other automatic mechanisms may be controlled. The follower means are herein shown as controlled, by way of example, by photo-electric devices of known type, and the known features of such a compass will be first described.

The glass compass bowl 10 (Fig. 1) is suspended from the closure plate 11 by means of clamps 12 engaging a marginal flange of the bowl. The structure of this bowl forms the subject matter of an application for patent filed by the present applicant of even date herewith. The frame to which the compass needle 13 is attached carries also a mirror 14 formed with upper and lower angularly disposed leaves, and a baffle plate 15 is also preferably attached to this frame. An upper baffle plate 16 has a marginal flange portion, clamped between the bowl 10 and closure plate 11, and a filling port 17 is centrally located above the bowl.

The photo-electric control devices are carried on a rotary plate 18, supported in the stationary casing or frame of the compass and consists of a light globe 19, mounted in a closure 20, the inner wall of which is provided with a vertical slot 21, lying immediately between the globe 19 and the mirror 14 of the compass. A condenser lens 22 is mounted within the closure, between globe 19 and slot 21, this lens being mounted for universal adjustment. As shown lens 22 is provided with an individual casing, having a slot located opposite to and narrower than slot 21. At either side of the slot 21 the wall of closure 20 has attached thereto mirrors 23, 24, angularly disposed as shown in Fig. 2, and at each side of the closure 20 a photo-electric tube 25, 26 is mounted on the plate 18.

Assuming movement of the conveyance upon which the compass is mounted so that the compass casing and plate 18 are rotated clockwise (Fig. 2) relatively to the compass needle, light from the globe 19 striking mirror 14 will be reflected therefrom to mirror 23, and thence to photo-electric tube 25, establishing current therethrough. Similarly, rotation of the plate 18 in a counter-clockwise direction will, through mirror 24, establish an electric circuit through photo-electric tube 26.

Tubes 25 and 26 have electrical connection each with one of a pair of thyratron tubes 27, 28, these tubes being biased through a rheostat 29 as shown diagrammatically in Fig. 2. Either one of these thyratron tubes being excited by an electric current passing through the photo-electric tube, serves to establish a circuit of comparatively high voltage through one or the other of a pair of relays 30, 31 (Fig. 1), which in turn control means for rotating plate 18 in one or in the other direction.

As shown, the relays 30, 31 serve to throw a pole reversing switch 32, interposed in the circuit of an electric motor 33, which motor has driving connections (not shown) with a short shaft 34, carried in the framing of the compass and provided with a pinion 35, which meshes with gear teeth formed in the periphery of plate 18.

Referring particularly to the wiring diagram (Fig. 2), wiring element No. 1 is connected to a source of alternating current electricity and serves to feed the thyratron tubes and the light bulb 19, the circuit returning through wiring element No. 3. Wiring element No. 2 connects the anodes of the photo-electric tubes with a source of direct current electricity. Assuming that light has energized the photo-electric tube 25, the circuit will first be established through wiring element No. 3, passing through a condenser-resistor unit 36 (a similar unit 37 being provided in connection with photo-electric tube 26), wherein voltage is developed causing current to flow to the grid of thyratron tube 27. This decreases the amount of negative polarity in tube 27 to a point where it becomes conductive, whereupon a circuit is established from a source of direct current electricity of comparatively high voltage, through relay 30 and wiring element No. 4 to thyratron tube 27.

From tube 27 current will flow through rheostat 29 to the return wiring element No. 3. Under these conditions, the plate 18 will be rotated counter-clockwise, until light from the globe 19 is reflected to photo-electric tube 26, whereupon thyratron tube 28 will be excited and the direction of flow in the circuit will be reversed, by the action of a condenser-resistor unit 38, and the high voltage circuit will be broken in thyratron tube 27. The further action of thyratron tube 28 is similar to that described for tube 27, relay 31 being excited by means of current established through wiring element No. 5, and the plate 18 rotated again in a clockwise direction.

Thus plate 18 and the electrical elements mounted thereon will be given a constant hunting action limited to a few degrees of movement, will maintain their position relative to the compass needle, and the rotation of motor 33 in one and the other direction, will be similarly controlled.

Before motor 33 is started, the driving connection may be disconnected and shaft 34 rotated by means of a key, until any repeater or other associated mechanism connected to the follower devices is brought into proper relation with the compass, the position of the parts being determined by comparison of compass or degree markings, applied to the periphery of plate 18 and visible through a sight opening 39 (Fig. 7) of the casing, with the reading of another compass. Upon reestablishing the driving connection and starting the motor, plate 18 will be rotated in a single direction until tubes 25, 26 are again located upon opposite sides of the north pole of the compass needle, where they will remain during the operation of the compass.

Means are provided for compensating for variations in the compass, due to different conditions both internal and external to the conveyance on which the instrument is mounted. Thus an "octal" compensator 40 is mounted below the compass bowl and serves to compensate for the disturbance of the compass by metallic objects forming a permanent part of the conveyance. Compensator 40 consists of eight threaded arms mounted in a head which is fixed in relation to the compass frame, and upon which any suitable number of metallic slugs 41 (Fig. 5) may be supported, the slugs being secured upon arms 40 by means of nuts 42. The same number of slugs 41 are placed upon any two opposite arms, the correct amount of metal to compensate for the disturbing influences being determined by locating the conveyance in different oriented positions and comparing the reading of the compass with that of a compass located externally of the conveyance.

Other compensators are located above the compass bowl, of which a "semi-circular" compensator 43 (Figs. 1 and 3) is adjustable by worm wheel devices 44, 45 to compensate for external or variable disturbances as they affect the compass while the conveyance remains in a level position. A "heeling" compensator 46 is also mounted above the compass bowl and serves to effect compensations when the conveyance assumes a tilted position, bringing the compass needle into altered relation with the sources of disturbance. The details of construction of the compensators 43 and 46 are well known and immaterial to the present invention, and have therefore not been shown.

The magnetic compensators

Applicant has found that it is desirable to use a larger expansion space than is commonly provided in liquid filled compasses now commonly in use. At the same time it is desirable to maintain the compensators 43 and 46 in position as close to the compass needle as possible, so that a mere enlargement of the expansion space by increasing the depth of the compass bowl is not desirable.

Compensator 43 is therefore mounted directly upon the closure plate 11, above the compass bowl, and an expansion chamber 47 is formed by a casing secured to the top of plate 11 and surrounding compensator 43 on three sides as seen in Fig. 3. The expansion chamber being for the most part thus offset from the compass bowl, is connected therewith by means of an air vent 48 (Figs. 3 and 4) and an extension of the filler port 17 extends radially through plate 11 to a filler opening normally closed by cap 49. Cap 49 is threaded into a sleeve 50 which surrounds an upstanding extension of the filler port, the space between this sleeve and the extension communicating with the expansion chamber 47 and forming an air vent during the filling of the compass. The lower end of port 17 extends through an opening in baffle plate 16 of larger diameter than the walls of port 17, so that during the filling of the compass bowl air may escape to the portion thereof above the baffle plate and thence to the expansion chamber. In order to protect the delicate compass mechanism during the filling operation, the lower end of the pipe forming port 17 is closed, and small lateral openings are formed in the lower end of the pipe, the liquid coming therefrom more or less in the manner of a spray. It may be noted that the lower end of the sleeve 50 forms a liquid seal to prevent filling of the expansion chamber with liquid.

It is also desirable to locate compensator 40 as close to the compass needle as possible, and for this purpose the plate 18 is formed as an annulus, this annulus surrounding a tube 51 (Fig. 1) attached at its lower end to the stationary frame of the compass, and a rod 52 extends upwardly through tube 51 and is provided with an upper seat upon which compensator 40 is mounted. Rod 52 has a chambered lower portion, the walls of which are split, a thumb screw 53 being engaged therewith and serving to spread the split portions of the rod into holding contact with the tube 51. The split portions of rod 52 are also provided with keyways engaging tooth extensions of the lower portion of tube 51, to hold the rod and thereby the compensator 40 in correct angular position relatively to the conveyance.

For convenience in assembling the slugs 41 upon the arms of compensator 40, the compensator is made removable from rod 52, the compensator being provided with a flange 54 having perforations designed to engage pins 55, fixed in a corresponding flange of rod 52. A pair of pivoted spring latching members 56, mounted on flange 54 are designed to engage the flange of rod 52 to hold the compensator in place upon the rod.

The collector rings 57 whereby the wiring of the parts mounted upon the rotary annulus 18 is connected with the wires leading to and from the compass casing, are located upon a lower sleeve extension 58 of the annulus, and the cooperating fixed contacts are mounted upon posts 59 secured in the bottom plate of the compass casing, the first mentioned wiring being led to the rings through ports 60 in the annulus. In order that the various compensators may be accessible for adjustment and the other parts of the compass may also be conveniently inspected and adjusted, the upper closure plate 11, with the compass bowl and other parts attached thereto, are formed as a removable unit, the plate 11 having a dependent skirt 61 having slip joint connection with the upper portion of the fixed frame or casing. This skirt extends below the bottom of the compass bowl and thus forms a support for the removed unit, preventing damage to the compass. A removable cover 62 is also provided for the parts located above the closure plate, this cover slipping over the upper portion of the skirt 61 and resting against stop pins secured in the skirt. The fixed frame, the removable unit and the cover are secured together by means of spring bales 63 (Figs. 3, 5, 6 and 7) which are designed to snap over studs fixed in the cover 62. Bales 63 are pivoted upon guide posts 64, which extend upwardly from a flange 65 of the compass casing, to a point higher than the tops of the tubes mounted upon annulus 18, so that in reassembling the parts, these tubes will not be hit by the compass bowl.

It is essential that after the arrangement of the slugs upon compensator 40, this compensator be fully and correctly seated upon rod 52. To insure this, the thumb portions 66 of the latches 56 are extended upward into close proximity to the bottom of the compass bowl 10, so that unless latches 56 are properly engaged beneath the flange of post 52, the parts 66 will prevent seating of the removable unit and engagement of the bales 63.

For convenience in assembling and removal the photo-electric units 19, 25, 26 and the thyratron units 27, 28, 29 are mounted upon separate subframes carried by the annulus 18, and each wiring connection between the two units and between a unit and a collector ring 57 is formed of two wires, removably joined by a binding member 67.

I claim:

1. In a magnetic compass having a bowl and an upper closure plate therefor; an expansion chamber laterally offset from the bowl and having port connection therewith through the closure plate, a filling port extending through the expansion chamber and communicating with the bowl through the closure plate, a liquid sealed air vent connecting the expansion chamber with the upper end of the filling port, and a magnetic compensator mounted upon said plate immediately above the bowl.

2. In a magnetic compass having a fixed frame; a removable unit including a compass bowl supported from said frame, a magnetic compensator removably mounted upon the fixed frame immediately adjacent to and below said bowl, and a spring latch designed to secure said compensator to the frame having a finger piece designed to extend, in its unlatched position, into the space normally occupied by the compass bowl.

3. In a magnetic compass having a fixed frame, and a compass bowl supported from said frame; a rod mounted in the lower portion of and extending upwardly within the fixed frame, a magnetic compensator mounted upon said rod immediately adjacent to and below the compass bowl, an annulus surrounding the rod and rotatably mounted upon said frame, and electrical follower devices mounted upon the annulus.

4. In a magnetic compass having a fixed frame, and a compass bowl supported from said frame; a rod mounted in the lower portion of and extending upwardly within the fixed frame, a magnetic compensator mounted upon said rod immediately adjacent to and below the compass bowl, an annulus surrounding the rod and rotatably mounted upon said frame, electrical follower devices mounted upon the annulus and including collector rings, and contact members mounted upon the lower portion of the frame and cooperating with said rings.

5. In a magnetic compass having a fixed frame; a removable unit including a compass bowl supported from said frame, and an upper closure plate for said compass bowl provided with a depending skirt extending below the bowl a rod mounted in the lower portion of and extending upwardly within the fixed frame; a magnetic compensator mounted upon said rod immediately adjacent to and below said bowl, an annulus surrounding the rod, and electrical follower devices including a light and photoelectric tubes mounted upon said plate and located between the compass bowl and the de- 6. In a magnetic compass having a fixed frame; a removable unit comprising a compass bowl supported from said frame, an upper closure plate for said compass bowl provided with a depending skirt, and a magnetic compensator mounted upon said plate immediately above the bowl; a plate rotatably mounted upon the fixed frame below the compass bowl, electrical follower devices including a light and photo-electric tubes mounted upon said plate and located between the compass bowl and the depending skirt, a removable cover inclosing the magnetic compensator, guide posts rigidly secured upon the fixed frame adjacent to the outer wall of the depending skirt, and latching devices designed to secure the removable cover and thereby the removable unit to said guide posts.

EDWIN F. BRITTEN, JR.

2,325,365

CERTIFICATE OF CORRECTION.

Patent No. 2,325,365.  July 27, 1943.

EDWIN F. BRITTEN, JR.

It is hereby certified that error appears in the printed specification of the above numbered patent requiring correction as follows: Page 3, second column, line 42, after "de-" insert --pending skirt--; and that the said Letters Patent should be read with this correction therein that the same may conform to the record of the case in the Patent Office.

Signed and sealed this 14th day of September, A. D. 1943.

(Seal)

Henry Van Arsdale,
Acting Commissioner of Patents.